United States Patent [19]

Walles et al.

[11] Patent Number: 4,902,493

[45] Date of Patent: Feb. 20, 1990

[54] PROCESS FOR THE GENERATION OF SULFUR TRIOXIDE REAGENT AND SULFONATION OF THE SURFACE OF POLYMERIC RESINS

[75] Inventors: Wilhelm E. Walles, Freeland; David R. Near, Midland; Donald L. Tomkinson, Auburn, all of Mich.

[73] Assignee: The Dow Chemical Company, Midland, Mich.

[21] Appl. No.: 190,312

[22] Filed: May 4, 1988

[51] Int. Cl.[4] .................. C01B 17/98; C01B 17/90; C01F 11/04; C07B 45/02

[52] U.S. Cl. .................. 423/522; 423/531; 423/532; 422/161; 422/292; 422/12; 422/31

[58] Field of Search .......... 423/522, 532, 531; 422/160, 161, 292, 298, 12, 31; 260/686

[56] References Cited

U.S. PATENT DOCUMENTS

| | | | |
|---|---|---|---|
| 2,281,762 | 5/1942 | Grace | 423/539 A |
| 2,832,696 | 4/1958 | Walles | 117/69 |
| 2,854,477 | 9/1958 | Steinhauer | 260/512 |
| 2,937,066 | 5/1960 | Walles | 8/4 |
| 2,945,842 | 7/1960 | Eichhern | 260/79.3 |
| 3,296,096 | 1/1967 | Portman et al. | 423/532 |
| 3,363,994 | 1/1968 | Brooks et al. | 260/686 |
| 3,592,724 | 7/1971 | Walles | 161/160 |
| 3,613,957 | 10/1971 | Walles | 220/64 |
| 3,625,751 | 12/1971 | Walles | 117/118 |
| 3,629,025 | 12/1971 | Walles | 156/69 |
| 3,770,706 | 11/1973 | Walles | 260/79.3 R |
| 3,803,297 | 4/1974 | Guth | 423/533 |
| 3,880,985 | 4/1975 | Haeseler | 423/533 |
| 3,959,561 | 5/1976 | Walles | 428/412 |
| 3,998,180 | 12/1976 | Hawkins | 118/5 |
| 4,046,866 | 9/1977 | Hurlburt | 423/533 |
| 4,213,958 | 7/1980 | Cameron | 423/522 |
| 4,220,739 | 9/1980 | Walles | 525/344 |
| 4,520,003 | 5/1985 | Peterson | 423/533 |
| 4,615,914 | 10/1986 | Walles | 427/237 |
| 4,643,887 | 2/1987 | Daley | 423/533 |
| 4,663,142 | 5/1987 | Cameron et al. | 423/532 |
| 4,673,560 | 6/1987 | Masse | 423/532 |

FOREIGN PATENT DOCUMENTS 889652 12/1981 U.S.S.R. ................. 423/522

*Primary Examiner*—Gary P. Straub

[57] ABSTRACT

The present invention provides a process for generating a reagent of sulfur trioxide in a carrier. A source of sulfur trioxide, a carrier, and oleum are introduced into a reagent generator. The sulfur trioxide, carrier, and oleum are then contacted to provide a reagent of sulfur trioxide in the carrier. Separate oleum and sulfur trioxide in carrier phases are formed, and oleum is removed from the reagent generator. The sulfur trioxide in carrier reagent is then ready to be used, preferably in a process to treat the surfaces of polymeric resin material such as medical devices fabricated from a variety of polymeric resins. The carrier may be either a liquid halocarbon solution or an inert gas.

10 Claims, 4 Drawing Sheets

PROCESS FOR THE GENERATION OF SULFUR TRIOXIDE REAGENT AND SULFONATION OF THE SURFACE OF POLYMERIC RESINS

BACKGROUND OF THE INVENTION

This invention relates to a process for the generation and recycling of a sulfur trioxide reagent in a carrier, and, more particularly, to a process incorporating such a sulfur trioxide reagent in a carrier for the surface treatment and sulfonation of polymeric materials.

Sulfonation of polymeric resins, that is, the introduction of the $-SO_3{}^-$ or $-SO_3H$ functional group into the surface of polymeric materials, is generally known. See, for example, Walles U.S. Pat. Nos. 2,832,696; 2,937,066; 3,592,724; 3,613,957; 3,625,751; 3,629,025; 3,770,706; 3,959,561; 4,220,739 and 4,615,914. Typically, the sulfonation is carried out by using gaseous mixtures of dry air containing from 2 to 8% sulfur trioxide which are then reacted with the polymeric material. Several known systems may be used to produce the sulfur trioxide. For example, oleum (concentrated sulfuric acid containing sulfur trioxide) ($H_2S_3O_{10}$) has been used as a source of sulfur trioxide gas. In such a system, dry air is passed through the oleum to facilitate sulfur trioxide stripping of the oleum by mass transfer.

Cameron et al, U.S. Pat. No. 4,663,142 discloses a continuous process for the generation of sulfur trioxide from oleum which introduces oleum feed to a sulfur trioxide desorption tower to form a gaseous mixture of dry air and sulfur trioxide. Masse et al, U.S. Pat. No. 4,673,560 teaches a process and apparatus for the generation of sulfur trioxide using microwave energy. A sulfur trioxide-rich oleum feed is subjected to microwave energy for a time sufficient to produce a sulfur trioxide vapor which is then mixed with dry air. In both processes, large amounts of spent acid are produced which must be disposed of or recycled in some manner. See also Walles U.S. Pat. No. 4,615,914, which teaches conversion of solid pills of polymeric sulfur trioxide into an air-sulfur trioxide gas mixture via microwave energy. This process leaves no residue.

One use of sulfur trioxide has been the surface treatment of a variety of polymeric resins to chemically modify their surfaces by a sulfonation reaction. For example, such surface sulfonated polymers are useful as substrates for painting and metal coating and are also useful as enclosure members for containing hydrocarbons such as gasoline and the like. Exemplary uses include containers such as gasoline and other fuel tanks, fuel barrels and drums, oleaginous food containers such as bags, tubs and cartons; fibrous materials for use in carpets, clothing and other fabric; and plastic substrates and metal-clad plastics such as capacitors, auto parts and the like; plastic substrates for use in electrostatic spray painting and the like.

Likewise, various medical devices are fabricated of or contain a variety of polymeric resins such as polycarbonates, polyurethanes, polysiloxanes and polyolefins. These polymeric resins are used to form housings, tubes, valves, and the like. Many of these medical devices are designed to come into contact with blood or other body fluids, either during removal from the body, during treatment of the fluid, or during the return of the fluid to the body. For example, such devices may include blood filters, blood oxygenators, dialyzers, tubing and the like. One basic requirement for all such medical devices is that the surfaces which contact the blood or other body fluid of a patient be water wettable.

Wettability is needed to prevent air bubbles from sticking to a surface and ending up in a patient's blood, or causing irregular flow through a tube or the like. Wettability is also important for preventing blood from sticking to or coagulating on a surface. However, most, if not all, of the plastic resins utilized in such medical devices have hydrophobic surface properties. Sulfonation of such surfaces becomes necessary to modify the surface properties of such resins to make those surfaces hydrophilic.

However, because such devices are to be used in medical applications and are designed to come into contact with body fluids, the sulfonation reaction must be controlled carefully. The strength of the sulfur trioxide reagent must be maintained within strict limits. If the strength of the reagent varies during treatment, the surfaces of the devices may be inadequately sulfonated necessitating the discarding of such devices. Additionally, the presence of even trace amounts of water may cause the formation of sulfuric acid which may adhere as small droplets to the surfaces of the plastic to be treated and cause irregularities. Finally, the generation of sulfur trioxide reagent as well as treatment of the surfaces of these products requires large volumes of the highly dilute sulfur trioxide reagent to be passed through the system. This results in large volumes of acid waste which must be properly disposed of or recycled in some manner.

Accordingly, there remains a need in the art for a process for generating a sulfur trioxide reagent in a carrier in controllable concentrations, and with an absolute minimum of impurities for the surface treatment and sulfonation of polymeric resin materials, particularly those used in medical devices. Further, there remains a need for a process which minimizes the amount of waste acid which requires disposal.

SUMMARY OF THE INVENTION

The present invention meets those needs by providing a process for the production of a sulfur trioxide reagent in a carrier and the use of the sulfur trioxide reagent materials. The process of the present invention delivers a stream of sulfur trioxide reagent and maintains the reagent stream within narrow, but adjustable concentration limits. Further, the process of the present invention receives and upgrades a waste stream of spent reagent, and discharges only a very small stream of waste, all in a single integrated process.

The sulfur trioxide reagent is a reagent of sulfur trioxide in a carrier. The carrier may be either a liquid halocarbon which is described below as the preferred embodiment or an inert gas such as dry air which is described below as the alternative embodiment.

In either event, the process for generating the reagent includes the step of introducing a source of sulfur trioxide into a suitable vessel such as a reagent generator. The source of sulfur trioxide may be gaseous sulfur trioxide or sulfur trioxide in a liquid vehicle, such as oleum containing 10-90% sulfur trioxide. That step may acutally include the introduction of a source of sulfur trioxide into a separate contact chamber and, from there, to the reagent generator along with recycled spent reagent of sulfur trioxide in carrier. The process also includes the step of introducing the carrier to the reagent generator, either as a liquid halocarbon or an inert gas. Finally, the process includes the step of introducing oleum into the reagent generator.

In the reagent generator, the sulfur trioxide, carrier and oleum are brought into contact by the mixing which may occur by reason of the force of the introduction of these materials, and a sulfur trioxide in carrier reagent is produced. The reagent is then sent to another vessel for treating the surface of a polymer resin part or device. Oleum is removed from the reagent generator for the purpose of regeneration and recycling. Residual oleum may be removed from the sulfur trioxide in carrier reagent with, for example, a filter and joined with the oleum from the reagent generator prior to waste removal and recycling. The overall process is, thus, one which provides for recycling and reuse of the various components.

With reference to the preferred embodiment of the present invention, a process for generating and recycling a solution of sulfur trioxide in a liquid halocarbon as the carrier is provided. The process includes the steps of introducing of a source of sulfur trioxide, a halocarbon, and oleum into a reagent generator. The sulfur trioxide, halocarbon, and oleum are contacted and mixed in the reagent generator to provide a reagent solution of sulfur trioxide in the halocarbon. Additionally, the oleum phase which forms is removed from the reagent generator for recycling. The sulfur trioxide in halocarbon solution phase is sent from the reagent generator to a parts treatment chamber located in the parts treatment loop. This separation of the two phases is readily accomplished due to the immiscibility of the halocarbon and oleum as well as the differences in density between the two and the high solubility of sulfur trioxide in the halocarbon.

The process of the present invention further includes the step of recycling the oleum phase removed from the reagent generator back to the reagent generator to reduce the amount of waste. Further, residual oleum is removed from the solution of sulfur trioxide in halocarbon by a filtration step to prevent the retention of any sulfuric acid in the reagent feed stream. The oleum removed from the solution may also be recycled to the reagent generator for reuse.

In the preferred embodiment, the process for generating the sulfur trioxide reagent solution also includes the surface treatment of polymer resins in a treatment chamber in the parts treatment loop. For example, medical deivces which may be made up of a number of different polymeric resin materials and which may have polymer fragments and/or unreacted monomers, grease, dust, bacteria and moisture on exposed surfaces thereof may be treated in accordance with the process of the present invention. The medical devices treated by the present process, in addition to being sulfonated, are rendered substantially free of moisture, dust, grease and bacteria and are therefore clean and sterile.

The process further includes the steps of feeding the reagent solution of sulfur trioxide in halocarbon to the treatment chamber, and recycling spent sulfur trioxide in halocarbon solution back to the reagent generator. In this embodiment of the invention, residual oleum is removed from the reagent solution of sulfur trioxide in halocarbon by a filtration step occurring between the reagent generator and the treatment chamber. Further, the source of sulfur trioxide, halocarbon, and spend sulfur trioxide in halocarbon solution may be contacted in a separate step prior to being sent to the reagent generator.

In the other embodiment of the invention, a process for generating a gaseous mixture of sulfur trioxide in inert gas as the carrier is provided. The inert gas may be air, nitrogen, oxygen, carbon dioxide, argon, helium or other inert gases such as low boiling halocarbons. Dry air is preferred. The process includes providing a source of oleum, introducing a source of sulfur trioxide and generating a sulfur trioxide in inert reagent including the step of introducing the oleum, sulfur trioxide, and inert gas into a reagent generator. The sulfur trioxide, inert gas and oleum are contacted and mixed to provide a gaseous reagent mixture of sulfur trioxide in inert gas. Finally, the oleum phase may be removed from the reagent generator for recycle, and the gaseous mixture of sulfur trioxide in inert gas may be sent to the treatment chamber from the reagent generator. Additionally, residual oleum is removed from the gaseous mixture of sulfur trioxide in inert gas by a filtration step.

In this embodiment of the invention, the process also includes the step of treating the surface of polymer resins with the sulfur trioxide reagent. For example, multi-plastic medical products which may have polymer fragments or even monomeric material on exposed surfaces thereof may be treated in accordance with the process of the present invention. The process further includes feeding the gaseous mixture of sulfur trioxide in inert gas to a treatment chamber in the parts treatment loop, and removing the spent gaseous mixture of sulfur trioxide in inert gas from the treatment chamber.

In this embodiment of the invention, the filtration step is carried out between the reagent generator and the treatment chamber to remove residual oleum from the gaseous reagent mixture of sulfur trioxide in inert gas. Further, the source of sulfur trioxide and the spent sulfur trioxide in inert gas may be contacted separately prior to being sent to the reagent generator.

Accordingly, it is an object of the present invention to provide a process for the generation of sulfur trioxide in a carrier and for using the sulfur trioxide in a carrier to sulfonate the surfaces of polymeric resin materials. This, and other objects and advantages of the present invention, will become apparent from the following detailed description, the accompanying drawings, and the appended claims.

DETAILED DESCRIPTION OF THE PREFERRED EMBODIMENTS

Figure 1:
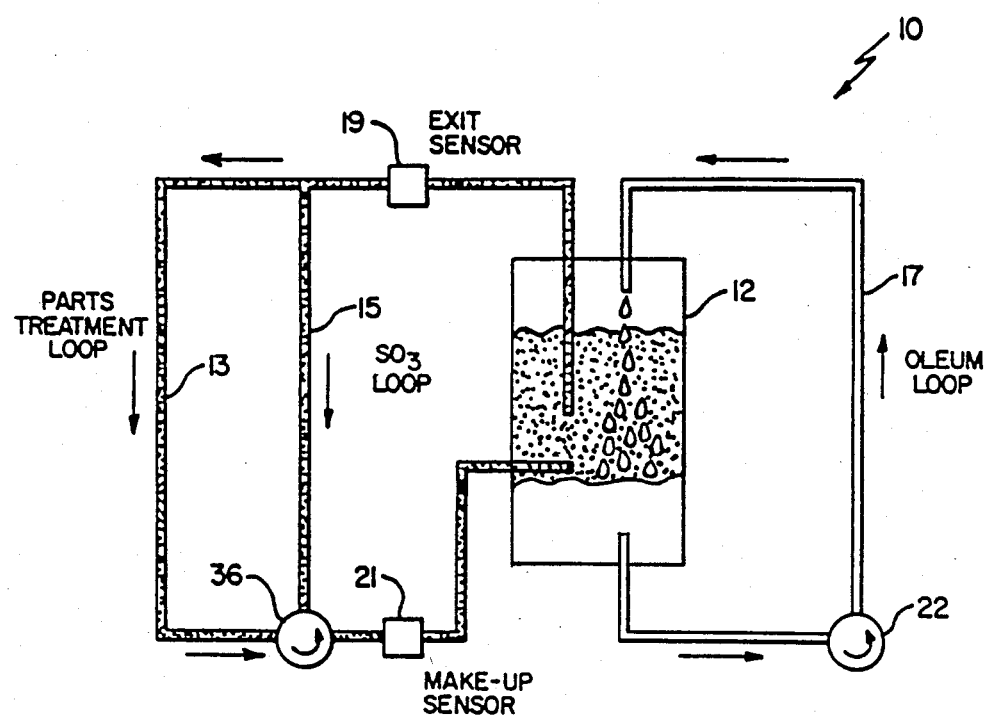
FIG. 1 is a schematic flow diagram of the process of the present invention.
Figure 2:
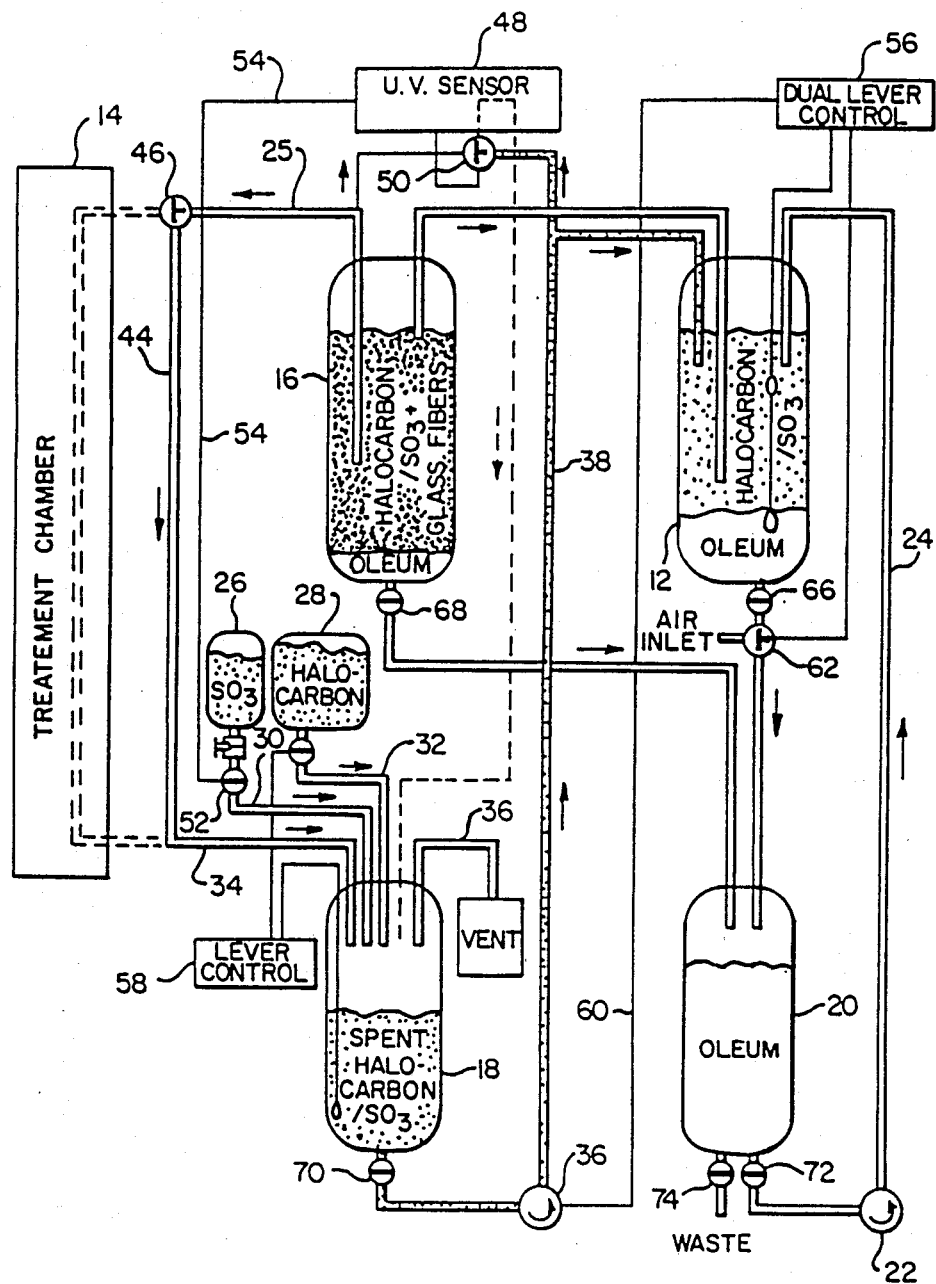
FIG. 2 is a more detailed schematic flow diagram of one embodiment of the process of the present invention.
Figure 3:
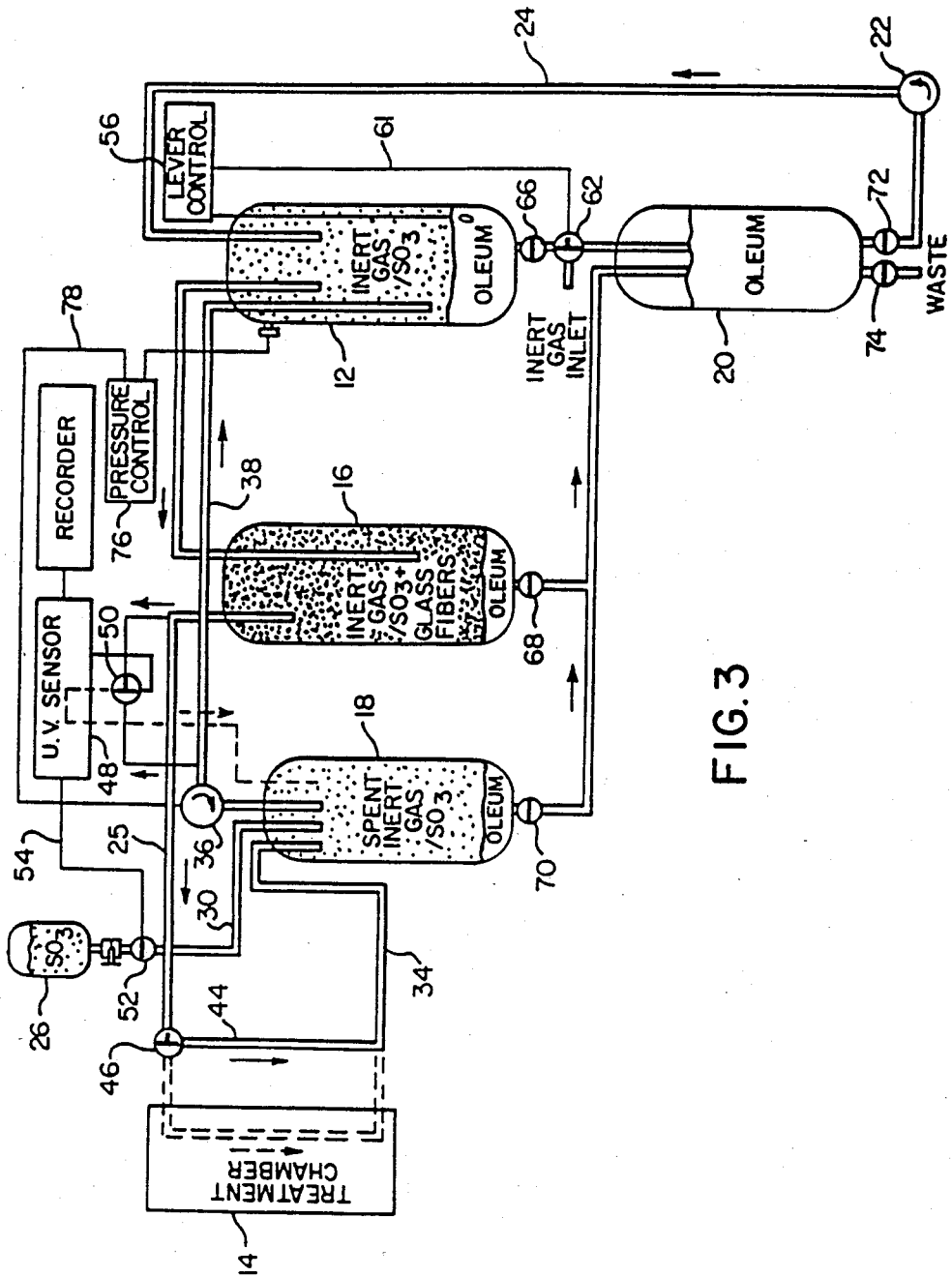
FIG. 3 is a more detailed schematic flow diagram of another embodiment of the process of the present invention.

Referring now to FIG. 1, there is illustrated in schematic form one embodiment of the process of the present invention. The preferred system for performing the process, generally indicated at 10, includes a reagent generator 12, a parts treatment loop 13, a sulfur trioxide recycle loop 15 and an oleum recycle loop 17. Pumps 22 and 36 are used in oleum recycle loop 17 and sulfur trioxide recycle loop 15, respectively. Likewise exit sensor 19, which senses the concentration of sulfur trioxide in liquid halocarbon of the reagent solution, and make-up sensor 21, which senses the concentration sulfur trioxide in returning carrier are provided. More detailed schematic diagrams of the two embodiments of the present invention are shown in FIGS. 2 and 3, where like reference numerals have been used for like parts. A more detailed discussion is also found in my copending application Ser. No. 07/190,313 pending (Docket C-36,046), filed on an even date herewith, and entitled "Apparatus for Generating and Recovering Sulfur Trioxide in a Carrier", which is hereby incorporated by reference.

In FIG. 2, which illustrates a preferred apparatus for the liquid halocarbon carrier embodiment of the invention, a treatment chamber 14 for the surface treatment and sulfonation of polymer resin materials is shown located in parts treatment loop 13. A final filter 16 is positioned between reagent generator 12 and treatment chamber 14. System 10 as shown in FIG. 2 also preferably includes a separate contact chamber 18 for contacting spent sulfur trioxide solution, a source of fresh sulfur trioxide, and halocarbon prior to being sent to reagent generator 12. An oleum source 20 communicating with reagent generator 12, is also provided.

Oleum is provided to reagent generator 12 from an oleum source 20 which may be a suitable storage container or chamber. The oleum is pumped by pump 22 through line 24 into reagent generator 12. Preferably, the oleum source utilized contains from about 0.05–95% and preferably 10–60% free sulfur trioxide.

Both sulfur trioxide and the halocarbon may be added directly to reagent generator 12, which in this instance is a reagent solution generator. However, in the preferred apparatus as shown, a sulfur trioxide source 26 and a halocarbon source 28 are provided, and both the sulfur trioxide and halocarbon are metered through lines 30 and 32, respectively, into contact chamber 18. Spent sulfur trioxide in halocarbon solution from treatment chamber 14 and/or diverted sulfur trioxide in halocarbon solution from filter 16 may also be sent to contact chamber 18 via line 34. Line 36 is provided to vent vapors formed in contact chamber 18 to atmosphere. The mixture of sulfur trioxide, halocarbon, and spent sulfur trioxide-halocarbon solution are sent from contact chamber 18 to reagent generator 12 using pump 36 and line 38.

Sulfur trioxide may be supplied either as a gas or preferably in a liquid from vehicle source 26. The halocarbon is provided as a liquid. Suitable halocarbons for use in the present invention include those relatively low molecular weight halocarbons which are liquids at temperatures below about 25 degrees C., have viscosities below about 200 centipoise, have densities which differ from the density of oleum (approx. 1.8–1.9), are substantially insoluble in oleum, and do not contain any carbon to hydrogen bonds. With respect to the latter requirement, any halocarbon containing carbon to hydrogen bonds would itself become sulfonated and soluble in oleum.

Examples of suitable halocarbons for use in the practice of the present invention include tribromofluoromethane, dibromochlorofluoromethane, bromodichlorofluoromethane, 1-bromo-1,1-dichlorotrifluoroethane, 1,2-dibromotetrafluoroethane, pentachlorofluoroethane, 1,2-difluorotetrachloroethane, 1,1,1-trichlorotrifluoroethane, 1,1,2-trichlorotrifluoroethane, trichlorofluoromethane, and other fluorinated or chlorinated alkyl hydrocarbons containing from 1 to 7 carbon atoms. A preferred halocarbon for use in the present invention is Freon 113, a trichlorotrifluoroethane available from E. I. duPont deNemours.

Reagent generator 12 functions not only as a mixer-separator, but also as a chemical reactor. The sulfur trioxide source, halocarbon, and oleum components of the mixture are introduced into reagent generator 12 with sufficient force to mix the components and provide contact among them so as to produce a reagent sulfur trioxide in halocarbon solution having a sulfur trioxide concentration of between about 0.001 to about 10%, and more preferably about 0.4 to about 2%. Alternatively, a mixing means such as a mechanical stirrer may be used to aid in mixing the sulfur trioxide, halocarbon and oleum.

Unlike the prior art, the oleum in reagent generator 12 does not function solely as a source of sulfur trioxide. Instead the oleum acts to remove impurities from the system. Applicant has found that commercially available liquid halocarbons contain traces of both water and hydrocarbon impurities, such as pentane and/or partly halogenated lower alkanes. When such hydrocarbon impurities are not removed from the system, the sulfur trioxide in the halocarbon reagent solution takes on a brown color. When moisture is not removed from the system, the reagent solution becomes cloudy. Likewise, commercially available sources of sulfur trioxide often contain boron oxide ($B_2O_3$) or its corresponding sulfate as an impurity. Oleum usually contains heavy metal sulfates originating from corrosion of metal surfaces with which is has come in contact. In addition, as previously mentioned there are impurities introduced into the system from the polymer resin treatment. These impurities include moisture, grease, polymer fragments, dust, bacteria, and the like.

Figure 4:
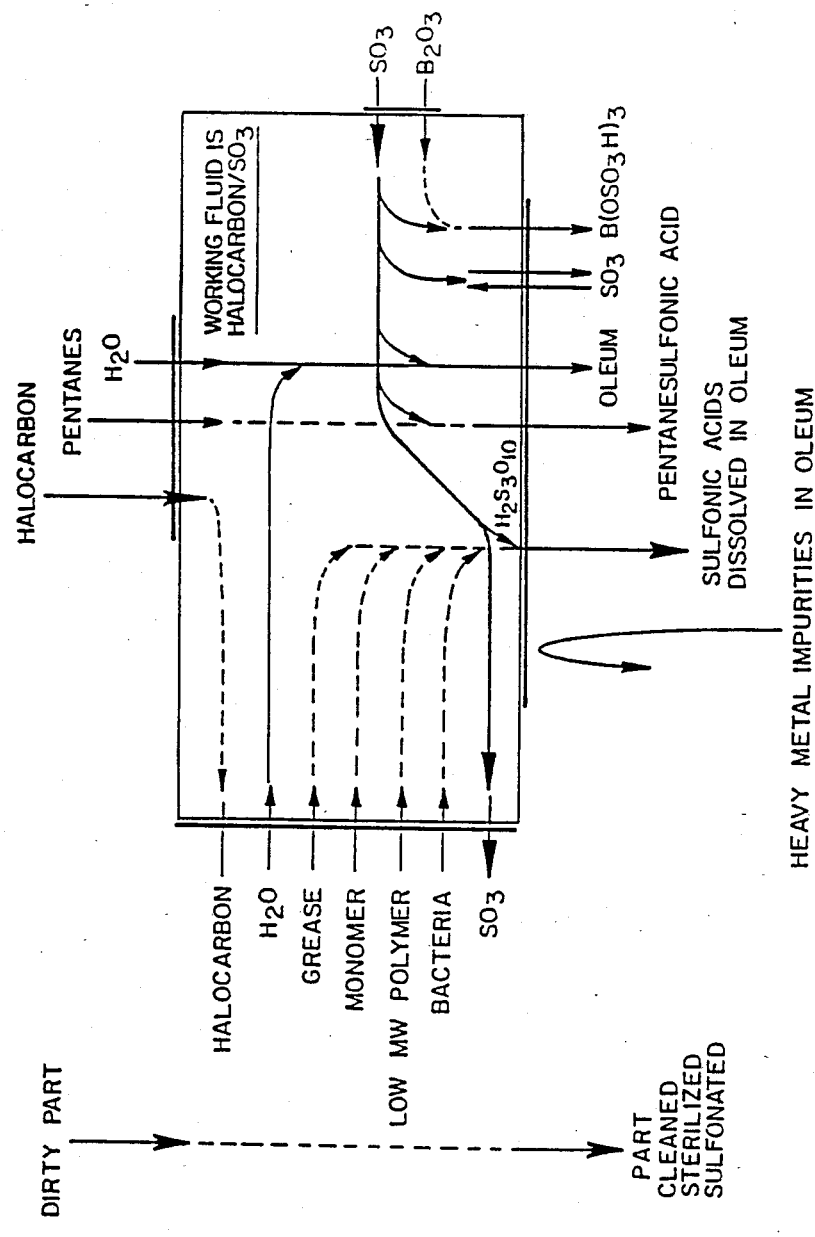
FIG. 4 is a flow diagram showing the dynamics of the working fluid of the present invention.

In the present process as shown in FIG. 4, these impurities as well as any heavy metal impurities in the oleum itself, are directed to and confined to the oleum phase of the system and do not contaminate the sulfur trioxide in halocarbon reagent solution. Thus, some of the sulfur trioxide present reacts with any moisture present to form $H_2S_3O_{10}$ which is insoluble in the halocarbon and becomes a part of the oleum solution in reagent generator 12. Further, trace hydrocarbon impurities, such as pentane, also react with the sulfur trioxide, become sulfonated, to form, for example, pentanesulfonic acid, and dissolve in the oleum. Again, such sulfonated hydrocarbons are not soluble in the halocarbon and are, thus, confined to the oleum phase of the system.

Any boron oxide present exists as a boron trisulfonic acid ($B(OSO_3H)_3$) which when brought into contact with the oleum in reagent generator 12 dissolves therein. The boron sulfonic acid is not soluble in the halocarbon and, therefore, is not a part of the sulfur trioxide in halocarbon reagent solution.

The sulfur trioxide in halocarbon solution in contacting the polymer resin to be treated, not only sulfonates the polymer, but also reacts with any moisture, grease, polymer fragments (monomer, low molecular weight polymer, etc.), dust, bacteria and the like to produce various sulfonic acids.

The spent sulfur trioxide in halocarbon solution which is recycled to contact chamber 18 from treatment chamber 14 will contain those sulfonated impurities. Upon being reintroduced into reagent generator 12 and thereby brought into contact with the oleum, the sulfonated impurities dissolve in the oleum, the sulfur trioxide in halocarbon solution is purified and the described process begins again or simply continues, depending on whether a discontinuous batch or continuous treatment cycle is involved. Thus the reagent generator 12 also acts as a gravity separator providing an upper level phase or pure sulfur trioxide in halocarbon reagent solution and a lower level phase of oleum containing sulfonated impurities. This gravity separation is readily accomplished because of the density differences between the halocarbon and oleum solutions and their immiscibility.

Of course, it will be recognized by those skilled in the art that a halocarbon liquid having a density greater than that of oleum may be selected. In that case, the sulfur trioxide in halocarbon reagent solution would form the lower layer in reagent generator 12, and the connections for the output lines from the reagent generator would be changed.

The concentration of sulfur trioxide in the halocarbon may be closely controlled in the system of the present invention to within a few parts per million. This is accomplished by maintaining a known concentration of oleum in reagent generator 12, controlling the addition of sulfur trioxide to the generator, and measuring the temperature therein. The distribution coefficient for free sulfur trioxide between the halocarbon and oleum solutions can be calculated readily for any given temperature. By adding sufficient make-up sulfur trioxide to the generator, a controllable concentration of free sulfur trioxide will be distributed to the liquid halocarbon phase. The concentration of sulfur trioxide in halocarbon can be analytically determined by litrations with a base, but preferably it is determined by an in-line sensor 48 such as an ultraviolet spectrophotometer. The output signal from sensor 48 can be used to control values 50 and 52 as explained more fully below.

Fresh reagent sulfur trioxide in halocarbon solution leaving reagent generator 12 is first subjected to filtration by sending the solution through filter 16 to remove any last traces of oleum which may be suspended in the solution. Filter 16 contains a filter medium such as glass wool fibers which act to entrap and remove any oleum. As shown, the oleum drained from filter 16 is recycled to oleum source 20. It may alternatively be sent to sulfur trioxide source 26 or contact chamber 18. The sulfur trioxide in halocarbon reagent solution is sent to treatment chamber 14 via line 25.

Further, an internal circulating line 44 is provided to connect line 25 carrying the output from filter 16 to line 34 which is the input line for contact chamber 18. This permits the system to fully circulate and balance the sulfur trioxide in halocarbon solution even when there is no treatment taking place in treatment chamber 14. Changing the system over from recirculation to treatment is accomplished by rotating a valve, such as T-valve 46.

Within treatment chamber 14 are placed the polymer resins to be treated. Alternatively, in some instances the reagent may be flowed directly through the part to be treated (i.e. when the part is configured so as to have a substance such as blood or other body fluid flowed through it in use). In that instance the part itself becomes the treatment chamber. In a preferred embodiment of the invention, the polymer resins form medical devices or parts thereof. However, it will be apparent that the system of the present invention can be used to treat and sulfonate the surfaces of a number of polymer resins for a variety of purposes. The sulfur trioxide in halocarbon reagent solution interacts with the polymer surface not only to clean and sterilize it, but also to chemically react with it.

The sulfur trioxide removes low molecular weight polymer impurities from the surface as well as processing aids which may remain on the surface of the polymer from an earlier polymerization procedure. Further, the sulfur trioxide combines with water in the cells of any bacteria present on the surface of the polymer resin to produce sulfuric acid which destroys the cell membranes of the bacteria. Some of the polymer fragments and dead bacteria will be removed by the sulfur trioxide in halocarbon solution as it is circulated through the device. Additional surface impurities will be removed by later washing and rinsing steps.

The sulfur trioxide also reacts with carbon to hydrogen bonds at the polymer surface to provide one or a number of monolayers of sulfonic acid functional groups at the polymer surface. Such sulfonic acid functional groups provide a number of desirable properties to the polymer surface. These include water wettability, antistatic, non-dust attracting, and nonfogging surface. Further, the resulting surface releases air bubbles more readily and is slippery to blood and other body fluids to prevent coagulation. Finally, the sulfonated surface provides a reactive functional group to which other bio-active compounds can be bonded.

In a preferred form, the process of the present invention may be automatically controlled through the use of sensors and controllers. As shown in FIG. 2, a sensor 48 is provided which monitors the concentration of sulfur trioxide in halocarbon solution at the output of filter 16 and just prior to the entry of sulfur trioxide in halocarbon into reagent generator 12. Samples of solution may be drawn from either of lines 25 or 38 and sent through sensor 48 which may sense the concentration of sulfur trioxide in the solution directly or indirectly by measuring the density, refractive index, or the adsorption of ultraviolet light at a selected wavelength. A valve, such as T-valve 50, may be actuated and rotated by a suitable controller (not shown) to switch the sampling from line 25 to line 38.

In either event, based on the concentration of sulfur trioxide sensed by sensor 48, valve 52 at sulfur trioxide source 26 may be actuated, as shown schematically by line 54, to provide additional sulfur trioxide to contact chamber 18 as needed.

The levels of liquid in reagent generator 12 and contact chamber 18 are regulated by level controllers 56 and 58, respectively. Level controller 56 is preferably a dual level control device which can sense the level of both the oleum and halocarbon phases in reagent generator 12. As shown schematically, when additional make-up sulfur trioxide in halocarbon solution is needed in reagent generator 12, level controller 56 activates pump 36 via line 60. If the level of oleum in reagent generator 12 rises too high, level controller 56 actuates a valve, such as T-valve 62, to rotate it from its position of open to atmosphere to a second position to drain oleum from generator 12 into oleum source 20.

Level controller 58 senses the level of liquid halocarbon in contact chamber 18. As additional liquid is required, level controller 58 actuates valve 64 to supply additional make-up halocarbon to contact chamber 18. Additional valves 66, 68, 70, and 72 are provided at the respective bases of generator 12, filter 16, contact chamber 18 and oleum source 20. While these valves are normally in the open position during operation of the system, they may be closed as needed. Further, valve 74 is provided at the base of oleum source 20 to bleed off a small portion of the oleum for disposal.

Preferably, contact chamber 18, sulfur trioxide source 26, and halocarbon source 28 are operated at atmospheric pressure, while reagent generator 12 and filter 16 are maintained at slightly above atmospheric pressure. Oleum source 20 contains trapped air under hydrostatic pressure from generator 12.

In another embodiment of the invention shown schematically in FIG. 3, and where like elements are represented by like reference numerals, sulfur trioxide is mixed with an inert gas such as dry air as the reagent for treatment. The system for carrying out the process preferably includes reagent generator 12 (which in this instance is a gaseous reagent generator), treatment chamber 14, filter 16, contact chamber 18, and oleum source 20. In this embodiment of the invention, inert gas supplied through inert gas inlet 29, is provided in reagent generator 12 in place of the liquid halocarbon of the previous embodiment.

The sulfur trioxide in inert gas reagent is produced in reagent generator 12 by contacting make-up sulfur trioxide and inert gas from contact chamber 18 with oleum provided form source 20. The sulfur trioxide in inert gas reagent, having a sulfur trioxide concentration of from about 0.5 to about 1%, is then sent to filter 16 for removal of any traces of oleum prior to being sent to treatment chamber 14.

In treatment chamber 14, the reagent contacts the surfaces of the polymer resins contained therein or when the treatment chamber 14 is the part itself, the reagent contacts the internal polymer resin surfaces of that part. Again, preferably, the polymer resins form a part or all of a medical device. The sulfur trioxide removes surface impurities, sterilizes the resin surface, and reacts with the surface to sulfonate it. Spent sulfur trioxide in inert gas is then recycled to contact chamber 18 through line 34, which is the input line for contact chamber 18.

Again, the process is preferably automatically controlled. Sensor 48 samples both the reagent mixture leaving filter 16 as well as the spent sulfur trioxide in inert gas mixture in contact chamber 18. Based on the concentrations sensed, a controller (not shown) actuates a valve, such as T-valve 52, to supply additional make-up sulfur trioxide as needed from sulfur trioxide source 26.

The pressure in reagent generator 12 is sensed by pressure controller 76. If additional sulfur trioxide in inert gas is required, controller 76 activates pump 36 via line 78 to provide the additional amount of sulfur trioxide in inert gas. Level controoller 56 senses the level of oleum in generator 12 and actuates a valve, such as T-valve 62, through line 61 as necessary to drain excess oleum from the reagent generator. A small amount of oleum is bled from the system through valve 74 as required and is disposed of by suitable means.

Again, sulfur trioxide source 26 and contact chamber 18 are maintained at atmospheric pressure while reagent generator 12 is maintained at slightly above atmospheric pressure. Inert gas is also supplied to oleum source 20 at slightly above atmospheric pressure.

As can be seen, both embodiments of the present invention provide processes for the production of sulfur trioxide reagent in a carrier which may then be used in the surface treatment and sulfonation of polymeric resin materials. The process of the present invention delivers a stream of sulfur trioxide reagent in a carrier while maintaining the concentration of sulfur trioxide in the reagent within narrow, but adjustable, limits. Further, the process of the present invention minimizes waste acid by receiving and upgrading spent reagent.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for regenerating a reagent of sulfur trioxide in a carrier comprising the steps of:
   (a) introducing sulfur trioxide, a carrier selected from the group consisting of non-reactive liquid halocarbons and non-reactive gases, and oleum into a reagent generator,
   (b) contacting said sulfur trioxide, said carrier, and said oleum to form a reagent phase containing a reagent of sulfur trioxide in a carrier and an oleum phase containing impurities,
   (c) removing said reagent phase from said reagent phase generator,
   (d) thereafter utilizing said reagent to treat a surface and form a spent reagent,
   (e) thereafter recycling said spent reagent to said reagent generator for regeneration,
   (f) removing said oleum phase from said reagent generator,
   (g) regenerating the oleum in said oleum phase to remove said impurities, and
   (h) recycling the regenerated oleum to said reagent generator.

2. The process of claim 1 including the step of filtering said reagent of sulfur trioxide in carrier to remove residual oleum therefrom.

3. The process of claim 2 including the step of recycling said residual oleum back to said reagent generator.

4. The process of claim 1 wherein a source of sulfur trioxide is introduced into a separate contact chamber containing said spent reagent prior to being sent to said reagent generator with the recycled spent reagent.

5. The process of claim 1 wherein said carrier is a liquid halocarbon selected from the group consisting of tribromofluoromethane, dibromochlorofluoromethane, bromodichlorofluoromethane, 1-bromo-1,1-dichorotrifluoroethane, 1,2-dibromotetrafluoroethane, pentachlorofluoroethane, 1,2-difluorotetrachloroethane, 1,1,1-trichlorotrifluoroethane, 1,1,2-trichlorotrifluoroethane, trichlorofluoromethane, and other fluorinated or chlorinated aklyl hydrocarbons containing from 1 to 7 carbon atoms.

6. The process of claim 1 wherein said carrier is an non-reactive gas selected from the group consisting of air, nitrogen, oxygen, carbon dioxide, argon, helium and low boiling hydrocarbons.

7. A process for treatment the surface of a polymeric resin material with a reagent of sulfur trioxide in a carrier and, then, regenerating said reagent, comprising the steps of:
   (a) introducing sulfur trioxide, a carrier selected from the group consisting of non-reactive liquid hydrocarbons and inert gases, and oleum into a reagent generator,
   (b) contacting said sulfur trioxide, said carrier and said oleum to form a reagent phase containing a reagent of sulfur trixoide in a carrier and an oleum phase containing impurities, (c) removing said reagent phase from said reagent generator, (d) feeding said reagent phase to a treatment chamber for a polymeric resin material, (e) contacting a surface of said polymeric resin material with said reagent and forming spent reagent, (f) recycling said spent reagent to said reagent generator, (g) removing said oleum phase from said reagent generator, (h) regenerating the oleum in said oleum phase to remove said impurities, and (i) recycling the regenerated oleum to said reagent generator.

8. The process of claim 7 including the step of filtering said reagent to remove residual oleum therefrom.

9. The process of claim 8 including recycling said residual oleum back to said reagent generator.

10. The process of claim 7 in which said sulfur trioxide, said carrier, and said spent reagent are contacted prior to being sent to said reagent generator.

* * * * *

UNITED STATES PATENT AND TRADEMARK OFFICE
CERTIFICATE OF CORRECTION

PATENT NO. : 4,902,493

DATED : February 20, 1990

INVENTOR(S) : Wilhelm E. Walles, David R. Near and Donald L. Tomkinson

It is certified that error appears in the above—identified patent and that said Letters Patent is hereby corrected as shown below:

Column 2, line 45 , insert after the word "reagent" the following phrase:  --so generated for the surface treatment of polymeric resin--.

Column 9, line 53, controoller should correctly appear --controller--.

Column 10, line 14, Claim 1 should read as follows:

1. A process for regenerating a reagent of sulfur trioxide in a carrier comprising the steps of:

a)  introducing sulfur trioxide from a source of sulfur trioxide, oleum from a source of oleum, and a carrier selected from the group consisting of non-reactive liquid halocarbons and non-reactive gases into a reagent generator, b)  contacting said sulfur trioxide, said carrier, and said oleum to form a reagent phase containing a reagent and an oleum phase containing impurities, said reagent being sulfur trioxide in a carrier, c)  removing said reagent phase from said reagent generator, d)  thereafter utilizing said reagent from said reagent phase to treat a surface and form a spent reagent,

UNITED STATES PATENT AND TRADEMARK OFFICE
CERTIFICATE OF CORRECTION

PATENT NO. : 4,902,493

DATED : February 20, 1990

INVENTOR(S) : Wilhelm E. Walles, David R. Near and Donald L. Tomkinson

It is certified that error appears in the above-identified patent and that said Letters Patent is hereby corrected as shown below:

e) thereafter recycling said spent reagent to said reagent generator along with said sulfur trioxide from said source of sulfur trioxide, f) removing said oleum phase from said reagent generator, g) regenerating the oleum in said oleum phase to remove said impurities, and h) recycling the regenerated oleum to said reagent generator along with said oleum from said source of oleum.

Column 10, line 36, Claim 2 should read as follows:

2. The process of claim 1 including between steps c) and d) the additional step of filtering said reagent phase to remove residual oleum therefrom.

Column 10, line 59, Claim 7 should read as follows:

7. A process for treating the surface of a polymeric resin material with a reagent of sulfur trioxide in a carrier and, then, regenerating said reagent, comprising the steps of:

a) introducing sulfur trioxide from a source of sulfur trioxide, oleum from a source of oleum, and a carrier selected from the group consisting of non-reactive liquid hydrocarbons ad inert gases into a reagent generator,

UNITED STATES PATENT AND TRADEMARK OFFICE
CERTIFICATE OF CORRECTION

PATENT NO. : 4,902,493     Page 3 of 4

DATED : February 20, 1990

INVENTOR(S) : Wilhelm E. Walles, David R. Near and Donald L. Tomkinson

It is certified that error appears in the above—identified patent and that said Letters Patent is hereby corrected as shown below:

b) contacting said sulfur trioxide, said carrier and said oleum to form a reagent phase containing a reagent and an oleum phase containing impurities, said reagent being sulfur trioxide in a carrier.

c) removing said reagent phase from said reagent generator, d) feeding said reagent from said reagent phase to a treatment chamber for a polymeric resin material, e) contacting a surface of said polymeric resin material with said reagent and forming spent reagent, f) recycling said spent reagent to said reagent generator along with said sulfur trioxide from said source of sulfur trioxide, g) removing said oleum phase from said reagent generator, h) regenerating the oleum in said oleum phase to remove said impurities, and i) recycling the regenerated oleum to said reagent generator along with said oleum from said source of oleum.

Column 12, line 5, Claim 8 should read:

UNITED STATES PATENT AND TRADEMARK OFFICE
CERTIFICATE OF CORRECTION

PATENT NO. : 4,902,493

DATED : February 20, 1990

INVENTOR(S) : Wilhelm E. Walles, et al

It is certified that error appears in the above-identified patent and that said Letters Patent is hereby corrected as shown below:

8. The process of Claim 7 including between steps c) and d) the additional step of filtering said reagent phase to remove residual oleum therefrom.

Signed and Sealed this

Twenty-seventh Day of August, 1991

Attest:

HARRY F. MANBECK, JR.

*Attesting Officer*      *Commissioner of Patents and Trademarks*